Dec. 3, 1968  I. LINDHOLM ET AL  3,414,438
FUEL CELL HAVING SINTERED POROUS ELECTRODE CONSISTING
OF ELECTRICALLY CONDUCTIVE
MATERIAL AND OF BORON
Original Filed Sept. 21, 1964

INVENTOR.
INGEMAR Lindholm
BO MUELLER
OLLE MJÖRNE

United States Patent Office 3,414,438
Patented Dec. 3, 1968

3,414,438
FUEL CELL HAVING SINTERED POROUS ELECTRODE CONSISTING OF ELECTRICALLY CONDUCTIVE MATERIAL AND OF BORON
Ingemar Lindholm, Bo Mueller, and Olle Mjörne, Vasteras, Sweden, assignors to Allmänna Svenska Elektriska Aktiebolaget, Vasteras, Sweden, a corporation of Sweden
Continuation of application Ser. No. 397,696, Sept. 21, 1964. This application Jan. 30, 1967, Ser. No. 612,730
Claims priority, application Sweden, Sept. 27, 1963, 10,557/63
6 Claims. (Cl. 136—86)

ABSTRACT OF THE DISCLOSURE

A fuel cell with at least one porous electrode consisting essentially of a body material produced by sintering a mixture of particles of an electrically conductive material and of boron, and by possibly dissolving out the boron, at least partially of the body material.

---

Figure 1:
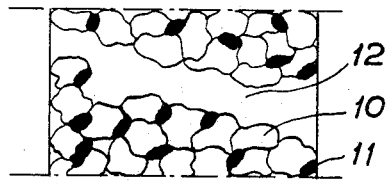

This application is a continuation of application Ser. No. 397,696, filed Sept. 21, 1964, now abandoned.

Electrical energy can be generated inter alia by means of reaction between a continually supplied combustible substance such as for example hydrogen and a continually supplied oxidising substance, such as for example oxygen, air or a halogen in a so-called fuel cell, which in its most simple form may consist of a suitable fluid electrolyte and two porous electrodes immersed in this, one of which is arranged between the electrolyte and the combustible substance and the other between the electrolyte and the oxidising substance.

The electrode reactions in the fuel cells occur at the points of contact between electrolyte, combustible and oxidising substances respectively and the electrode. These points of contact are situated at the points in the electrodes where electrolyte and combustible and oxidising substances respectively are adjacent to each other. The points in the electrodes which are active when a reaction occurs are therefore situated in the pore surfaces.

A porous electrode in a fuel cell need not form a separating wall between a gas chamber containing a gaseous substance, such as a fuel, and an electrolyte chamber containing a fluid electrolyte. The combustible substance may namely be dispersed or dissolved in the electrolyte, as is the case with cells for fluid fuel and then the electrolyte is present with its fuel on both sides of the electrode as well as in its pores. Certain oxidants, for example hydrogen peroxide, may also be dissolved in the electrolyte and then the conditions on the oxidant side are analogous to those described for the electrode on the fuel side in fuel cells with fluid fuel.

In fuel cells it is known to use electrodes which in the main are formed of nickel and in which the areas nearest the pore walls contain nickel in activated form. In the parts of the electrodes situated outside the mentioned areas, nickel is present in inactive form and its function is then to act as a carrier material for the active areas situated nearest the pore walls. Such an electrode may according to a known method be produced by using nickel powder and a powder consisting of an aluminium-nickel alloy ("Raney alloy"). A mixture of the powder is then pressed together to an electrode, which is then sintered. After the sintering the aluminium is dissolved out of the aluminium-nickel alloy ("Raney alloy") in the sintered product with alkali, micropores thus being formed. The area around the pores becomes active due to the large pore surfaces and the disturbed crystal lattice, which the remaining material has after the dissolution of the aluminium. As previously indicated, after the sintering the pure nickel powder acts as a carrying body for the electrode, while the material of the alloy remaining after the dissolution with alkali forms the active area which surrounds the pores. As a substitute for the pure nickel powder for the known electrodes, carbon, iron and cobalt powder have been proposed and as a substitute for the said alloy, other alloys, in which nickel can be replaced by cobalt or iron, and aluminium by silicon, magnesium or zinc. Among other things the electrodes can be used as fuel electrodes for hydrogen.

In the U.S. patent application Ser. No. 191,120 there has moreover been proposed a method of manufacturing porous electrodes by sintering together a mixture of particles of nickel and of aluminium and subsequently at least partial dissolving the aluminium out of the product sintered together. The nickel powder can also be replaced by iron, cobalt, molybdenum, tungsten or silver powder and the aluminium powder by magnesium, zinc or silicon powder in this product.

It has now been proved possible to manufacture an electrode material which has essential advantages over those earlier known or proposed. The electrode material manufactured according to the present invention is thus resistant against air and can, contrary to the electrode materials described above, be kept in open air without difficulty. Another important advantage of the electrode material is that it withstands high operating temperatures which, when the electrode material is used in hydrogen-oxygen cells, means that the removal of the water formed by the reactions is facilitated. Another advantage of great significance is that only a very small amount of an activating material is required for the manufacture of the electrode material. An important advantage is further that the electrode material can be used directly after the sintering and need not be subjected to any subsequent treatment, such as a dissolution process with alkali. That brings an important simplification of the production, since the dissolution process constitutes in itself a very troublesome procedure because of the large quantity of alkali which must be used, the strong evolution of hydrogen which occurs and the pyrophoric nature of the material resulting from the treatment.

The invention relates to a method of manufacturing a porous electrode material, preferably for use in fuel cells, in which a powder mixture comprising particles of an electrically conducting material, for example nickel, and particles of a material activating the conducting material are sintered together to a coherent product. The method is characterized in that boron is used as activating material and in that the boron may be at least partially dissolved out of the sintered product.

The electrically conducting material may preferably comprise one of the substances iron, nickel, cobalt, silver, tungsten or molybdenum or mixtures of these substances.

In order to improve the activity of the manufactured electrode material a small amount of a compound of one or several of the metals chromium, molybdenum, tungsten, titanium, aluminium, thorium, cobalt or platinum can be supplied to the powder mixture which is to be subjected to sintering. The compound of the metal in question will be of such a type that it gives oxide formation during sintering. In this way small amounts, less than 2 percent by weight, of these metals are incorporated in the sintered electrode material. An electrode material with especially high activity is obtained if the sintering is performed in a hydrogen atmosphere. A possible explanation of this may be that boron hydride may then be formed as an intermediary product which can react with the conducting material at all its occurring surfaces.

The powder mixture which is to be sintered consists suitably for the main part of particles of the electrically conducting metal. The boron percentage in the powder mixture lies suitably at 0.1–10 percent by weight, preferably at 0.5 to 5 percent by weight, based on the total weight of the powder mixture.

The particle size of the particle materials may be varied within wide limits depending on the fuel and electrode type in question. The size of the pores in a manufactured electrode is determined to a great extent by the size of the particles used. In most cases it is desirable that all the pores are the same size, which is attained through the use of well demarcated powder fractions. In many cases it is suitable to use powder fractions with an average particle size of $0.5-50\mu$ for the boron and powder fractions with an average particle size of $1-50\mu$ for the conducting material. With the use of nickel as conducting material it has been found especially advantageous to use powder fractions with an average particle size less than $10\mu$ for the boron and powder fractions with an average particle size less than $25\mu$ for the nickel. In order to increase the porosity of the electrode there may be added to the mixture of the particles up to 25 percent by weight of an expanding agent, for example, ammonium carbonate or ammonium bicarbonate, capable of being dissociated into gaseous products during the sintering process.

The sintering of the powder mixture to an electrode material may advantageously in many cases be done at a temperature of around 500–1500° C. depending on the kind of the conducting material.

If a porous electrode material produced by sintering together a conducting material of the above mentioned type and boron is placed in an alkaline liquid, an at least partial dissolution of the boron out of the electrode material takes place slowly. In certain cases such a dissolution can also take place in acid or neutral liquids. It has been found that after such a dissolution the electrode material is at least as active as before the dissolution. Such a dissolution of the boron is automatically obtained if an electrode material with boron on the pore surfaces is used in a fuel cell with an alkaline liquid, for example, potassium hydroxide, as the electrolyte or in another arrangement with alkaline electrolyte, in which electrode reactions with hydrogen as a participant part are utilized for the generation of electrical energy. Of course, if so desired, the said dissolution can be carried out before the electrode material is arranged in the fuel cell or in the said arrangement.

Figure 2:
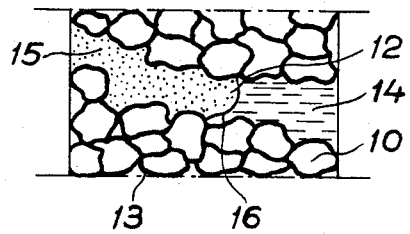

The invention may be further explained in connection with the description of a number of embodiments:

In this explanation reference is made to FIG. 1 and FIG. 2 showing an enlargement of a small part of an electrode material according to the invention before and after the sintering operation respectively.

In FIG. 1, 10 designates particles of an electrically conducting material, e.g., nickel and 11 particles of boron. Between the particles which are compressed there are open spaces forming together pores 12. After the sintering the particles 10 of electrically conducting material are provided with surface layers 13 containing boron. The boron may eventually be dissolved out by a solvent such as potassium hydroxide. In such a case active surface layers remain on the electrically conducting material. 14 designates an electrolyte penetrating the electrode material from one side and 15 a combustible gas penetrating the electrode material from the other side. The electrolyte and the gas form a boundary 16 in the pore.

Example 1

1 percent by weight of amorphous boron powder with an average particle size of 2 $\mu$m. is mixed with 99 percent by weight of carbonyl nickel powder with an average particle size of 5 $\mu$m. The mixture is pressed to electrodes with a pressure of 1000 kiloponds/cm.$^2$, and is sintered in a hydrogen atmosphere at 600° C. for 30 minutes.

Example 2

0.5 percent by weight of amorphous boron powder with an average particle size of 2 $\mu$m. is mixed with 98.5 percent by weight of carbonyl nickel powder with an average particle size of 5 $\mu$m. and 1 percent by weight of chromium hydroxide powder with an average particle size of 5 $\mu$m. The mixture is pressed to electrodes with a pressure of 1000 kiloponds/cm.$^2$ and is sintered in a hydrogen atmosphere at 700° C. for 30 minutes.

Example 3

2 percent by weight of amorphous boron powder with an average particle size of 2 $\mu$m. is mixed with 88 percent by weight of carbonyl nickel powder with an average particle size of 5 $\mu$m. and 10 percent by weight of ammonium bicarbonate powder with an average particle size of 40 $\mu$m. The mixture is pressed to electrodes with a pressure of 2000 kiloponds/cm.$^2$ and is sintered in a hydrogen atmosphere at 800° C. for 30 minutes.

Example 4

4 percent by weight of boron powder with an average particle size of 5 $\mu$m. is mixed with 96 percent by weight of nickel powder with an average particle size of 10 $\mu$m. The mixture is pressed to electrodes with a pressure of 1000 kiloponds/cm.$^2$ and is sintered in vacuum at 900° C. for 30 minutes.

EXAMPLE 5

1 percent by weight of amorphous boron powder with an average particle size of 2 $\mu$m. is mixed with 99 percent by weight of molybdenum powder with an average particle size of 30 $\mu$m. The mixture is pressed to electrodes with a pressure of 1000 kiloponds/cm.$^2$ and is sintered in vacuum at 1000° C. for 60 minutes.

EXAMPLE 6

2 percent by weight of amorphous boron powder with an average particle size of 2 $\mu$m. is mixed with 98 percent by weight of carbonyl iron powder with an average particle size of about 20 $\mu$m. The mixture is pressed to electrodes with a pressure of 2000 kiloponds/cm.$^2$ and is sintered in a hydrogen atmosphere at 800° C. for 30 minutes.

For all the electrode materials produced according to the examples it is found that after they have been used as fuel electrodes in a fuel cell with potassium hydroxide, for example a 30 percent potassium hydroxide water solution as an electrolyte and thereby at least a partial dissolution of the boron has taken place, they show an activity which is at least as great as the original one. Not even after use for a long time, when nearly all boron may be dissolved, do the electrodes show a decreased activity.

The electrodes described could be used in fuel cells with different electrolytes, such as for example potassium or sodium hydroxide solutions. The electrode material may not only be formed into plates but also amongst other things as pellets, grains or the like. Such electrode material in pellet or grain form is used, inter alia in fuel cells with fluid fuel, for example alcohol or hydrazin dissolved in the electrolyte, in which case for example it may be arranged in a container manufactured of a net or perforated sheet metal. The electrode material may also be used in fuel cells of the type where the electrolyte consists of an ion exchange membrane of organic or inorganic type.

The electrodes described may with advantage be used not only in fuel cells but also in other types of arrangements where electrode reactions with hydrogen as a participant part are used for generation of electrical energy, for example in accumulators.

We claim:

1. A fuel cell having electrodes in contact with an electrolyte, at least one of said electrodes being porous, and permeable to gas, and consisting essentially of a sintered mixture of particles of an electrically conductive material and of boron; the percentage of boron being 0.1–10 percent by weight of the sintered mixture, said electrically conducting material being at least one substance selected from the group consisting of iron, nickel, cobalt, tungsten and molybdenum.

2. A fuel cell as claimed in claim 1, in which the boron is at least partially dissolved out of the sintered mixture.

3. A fuel cell as claimed in claim 2, in which the electrically conducting material consists essentially of nickel.

4. A fuel cell as claimed in claim 2, in which the electrically conducting material consists essentially of cobalt.

5. A fuel cell as claimed in claim 1, in which the electrically conducting material consists essentially of nickel.

6. A fuel cell as claimed in claim 1, in which the electrically conducting material consists essentially of cobalt.

References Cited

UNITED STATES PATENTS

| | | | |
|---|---|---|---|
| 1,030,666 | 6/1912 | Kuzel | 75—207 |
| 1,648,679 | 11/1927 | Fonda | 252—518 X |
| 2,059,041 | 10/1936 | Schroter et al. | 75—202 X |
| 2,073,826 | 3/1937 | Balke | 75—202 |
| 2,725,287 | 11/1955 | Cronin | 75—200 |
| 2,769,114 | 10/1956 | Williams | 252—512 X |
| 2,860,175 | 11/1958 | Justi | 75—222 X |
| 2,936,250 | 5/1960 | Glaser | 106—66 X |
| 3,151,386 | 10/1964 | Ingersoll | 75—202 X |
| 3,183,123 | 5/1965 | Haworth | 136—86 |
| 3,183,124 | 5/1965 | Jasinski | 136—86 X |
| 3,202,862 | 8/1965 | Paley | 252—512 X |

WINSTON A. DOUGLAS, *Primary Examiner.*

A. SKAPARS, *Assistant Examiner.*